(12) United States Patent
Ghizawi

(10) Patent No.: US 6,668,553 B1
(45) Date of Patent: Dec. 30, 2003

(54) EJECTOR-BASED COOLING SYSTEM FOR TURBOCHARGERS

(75) Inventor: Nidal A. Ghizawi, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/243,000

(22) Filed: Sep. 13, 2002

(51) Int. Cl.[7] .................................... F02B 33/44
(52) U.S. Cl. ................. 60/605.3; 60/605.1; 417/407; 415/116; 415/112; 415/111
(58) Field of Search ..................... 60/605.3, 605.1, 60/608, 611; 384/316; 417/407; 415/116, 112, 111

(56) References Cited

U.S. PATENT DOCUMENTS

| | | | |
|---|---|---|---|
| 4,287,717 A | * | 9/1981 | Oldfield et al. ............... 60/606 |
| 4,573,808 A | * | 3/1986 | Katayama ................... 415/111 |
| 5,102,305 A | * | 4/1992 | Bescoby et al. ............. 417/407 |

FOREIGN PATENT DOCUMENTS

| | | | |
|---|---|---|---|
| DE | 10040508 A1 | * 2/2002 | ............ F01P/3/12 |
| JP | 56113829 A | * 9/1981 | ........... F16C/37/00 |
| JP | 57210154 A | * 12/1982 | .......... F02M/21/04 |
| JP | 58138223 A | * 8/1983 | ........... F02B/39/00 |
| JP | 62094723 A | * 5/1987 | ............ F23L/5/00 |

* cited by examiner

Primary Examiner—Thomas Denion
Assistant Examiner—Thai Ba Trieu
(74) Attorney, Agent, or Firm—Ephraim Starr

(57) ABSTRACT

A turbocharger component cooling system employs an ejector using energizing gas from the turbocharger system to draw cooling fluid through a plenum around the component to be cooled into the secondary inlet of the ejector and dumping the combined energizing and cooling gas flows into a low pressure dump. Energizing gas is drawn from the high pressure side of the compressor or turbine flows in the turbocharger and returned to the low pressure side in the same flow.

26 Claims, 5 Drawing Sheets

EJECTOR-BASED COOLING SYSTEM FOR TURBOCHARGERS

BACKGROUND OF THE INVENTION

1. Field of the Invention

This invention relates generally to the field of cooling of components in turbocharger systems and, more particularly, to an ejector entrainment arrangement for drawing cooling air through components of the turbocharger for operating temperature reduction.

2. Description of the Related Art

Turbocharger systems are rapidly evolving for higher performance. Novel bearing systems such as air bearings and supplemental energy devices such as electrical motor systems for accelerating turbine and compressor rotors in low exhaust energy states are being developed for increasing range and performance of current turbochargers. These systems often require temperature regulation for efficient operation. The relatively high operating temperatures of turbocharger components provide minimal availability of conductive heat reduction. Water jacketing systems have been used with some success in reducing operating temperatures of conventional bearings, however, liquid cooling systems require complex casting, machining and sealing technologies for implementation. In addition, current engine systems are operating at the upper limits of heat load rejection without undesirable increases in sizing of cooling heat exchanger components and addition of more cooling requirements may not optimize the overall engine cooling system.

It is therefore desirable to provide alternative cooling methods for new turbocharger components which limit operational impact on current engine heat exchanger components.

Additionally, a system for providing cooling flow to a turbocharger device is desirable with the ability to support compressor operation all the way from choke to surge, and from low to high shaft speeds.

Further, cleanliness of the provided cooling flow is required to avoid any possible harmful contamination or startup problems and a compact system with minimum impact on the engine overall performance is desirable.

SUMMARY OF THE INVENTION

The present invention provides a turbocharger component cooling system using an ejector having a primary inlet, a secondary inlet and an outlet. An energizing gas conduit connects a first bleed port from a high energy gas source and the primary inlet of the ejector. A cooling gas conduit connects a coolant inlet to a component cooling plenum and then connects the cooling plenum to the secondary inlet of the ejector. An outlet gas conduit connects the ejector outlet to a low pressure dump. In one embodiment, the energizing gas source is the output of the turbocharger compressor while in a first alternative embodiment, the energizing gas source is the exhaust gas inlet to the turbocharger. For these embodiments, the low pressure dump is the compressor inlet and the turbine exhaust gas outlet, respectively.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
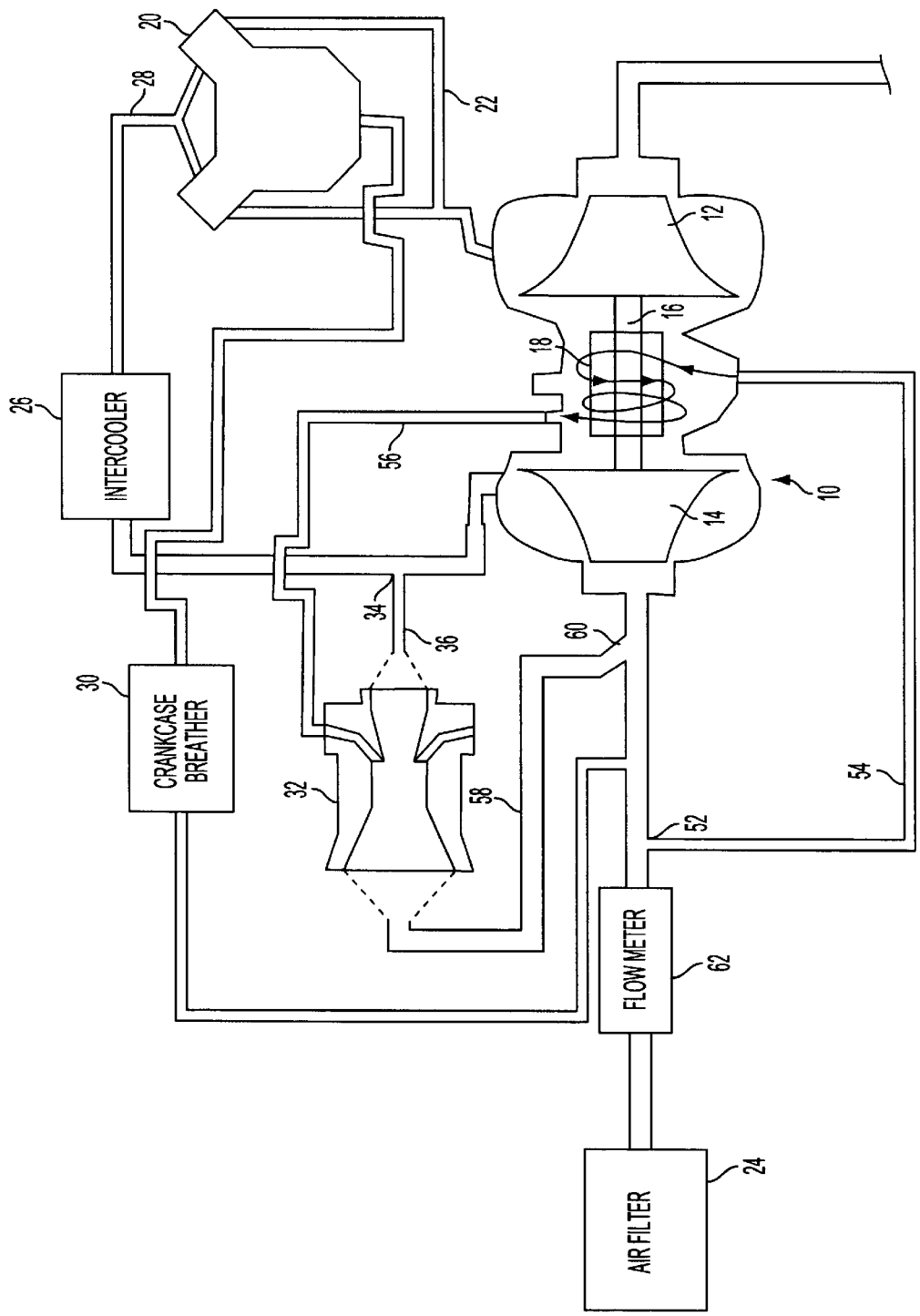
FIG. 1 is a schematic block diagram of a turbocharger system employing an ejector cooling entrainment system according to the present invention using compressor outlet bleed flow as a source of high energy gas for the primary ejector flow.

Referring to the drawings, FIG. 1 schematically demonstrates an embodiment of the present invention for cooling bearing components in the center housing of turbocharger 10 having a turbine 12 and a compressor 14 interconnected by a shaft 16. The shaft is supported by a bearing system 18 which is mounted within the center housing as will be described in greater detail subsequently. The turbocharger operates in a conventional fashion with the turbine receiving exhaust gas from the engine 20 through exhaust manifold 22. Charge air for the engine is provided from an air intake through an air filter 24 to the inlet of the compressor. After compression the charge air flows through an intercooler 26 through the inlet manifold 28 to the intake of the engine. In the embodiment shown for a diesel engine, a crankcase breather 30 is connected to the inlet conduit for the compressor.

Figure 2:
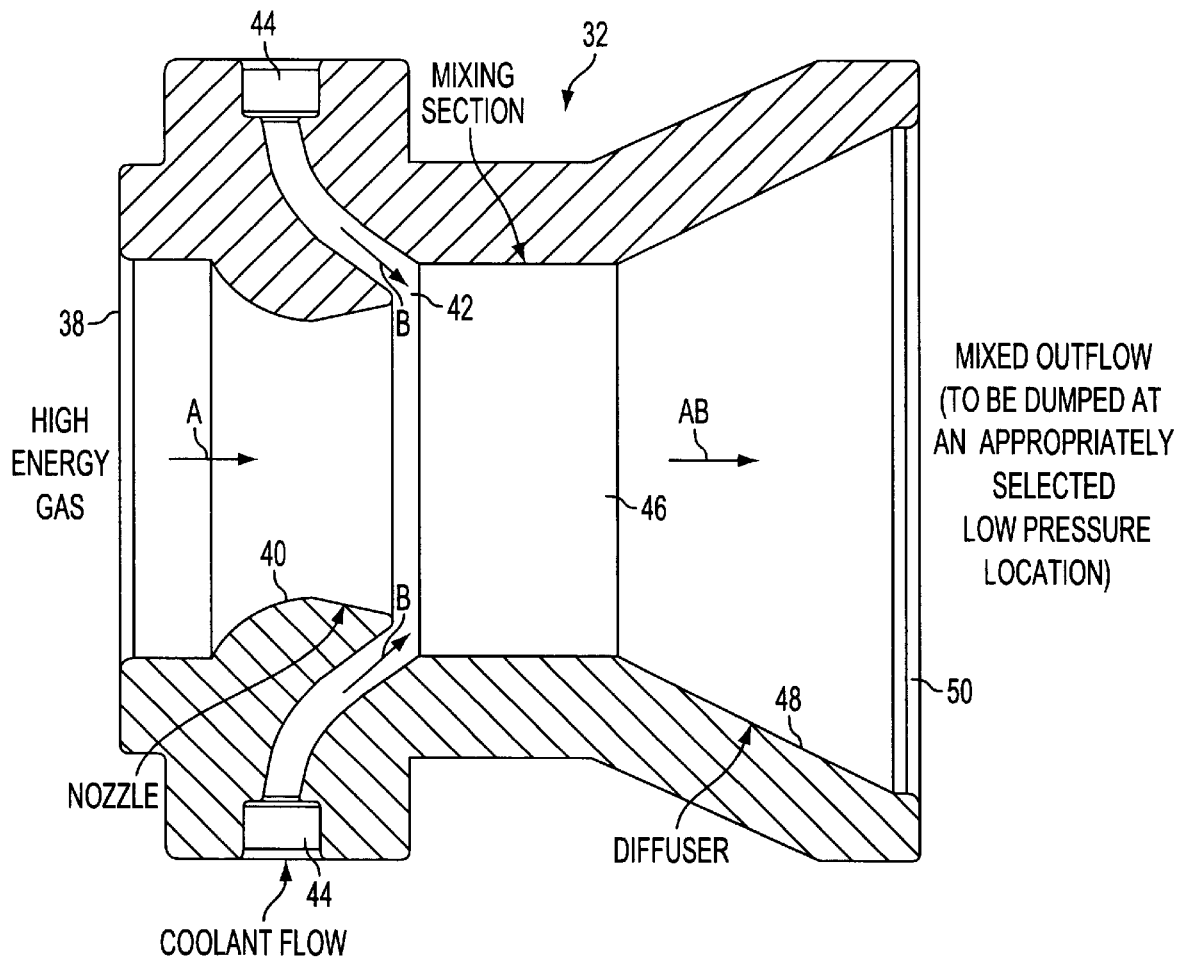
FIG. 2 is a sectioned elevation view of an embodiment of the ejector for use in the system shown in FIG. 1.

An ejector 32 receives high energy air, in the embodiment of FIG. 1, as bleed flow from the compressor discharge through a bleed port 34 and conduit 36. The ejector, best seen in FIG. 2 in an exemplary embodiment, directs the high energy bleed flow into the ejector primary flow inlet 38 through a nozzle 40 increasing the velocity of the bleed flow as the primary gas stream generally designated "A". In the embodiment shown the nozzle is converging; however, in alternative embodiments, a converging-diverging nozzle is employed for obtaining desired flow velocity and pressure. An annular slot 42 in the ejector downstream of the nozzle provides the inlet for entrainment of the secondary gas stream entering the ejector through one or more secondary flow inlet ports 44. The secondary gas stream generally designated "B" constitutes the coolant which is drawn into the low pressure nozzle exit 46 of the ejector for entrainment and mixing with the primary gas flow. The mixed stream generally designated "AB" then passes through a diffuser 48 to the outlet of the ejector 50 in the embodiment shown in the drawings.

Returning to FIG. 1, the coolant flow for entrainment in the ejector is drawn as a bleed flow from the compressor inlet through a second bleed port 52. The cooling air is bled downstream of the engine air-filter and any air flow-meter the engine may have, but upstream of the crankcase breather (if connected to the compressor inlet as shown in FIG. 1) to eliminate any need for further filtering devices. The coolant flows through first coolant conduit 54 to a plenum associated with the component to be cooled, in the case of FIG. 1 the bearing system, and through a second coolant conduit 56 to the secondary flow inlet ports of the ejector. The mixed stream from the ejector is then returned through conduit 58 to be dumped in the low energy flow at the compressor inlet. Reintroduction of the mixed flow from the ejector into the charge air is accomplished through a "Y" or annular mixer generally designated 60 adjacent the inlet of the compressor.

The high flow density at compressor discharge bleed port allows the ejector to be very compact. Impact of the bleed flow on engine performance is minimized by rematching the turbocharger to the engine under the bleed conditions, or by changing the positioning of the vanes in Variable Nozzle Turbine turbochargers, or both where possible. In addition, using this embodiment, there is no need for any additional engine control related flow metering to account for the bled compressor discharge flow that is not getting to the engine since all the flow that is bled from the compressor is dumped back into the compressor inlet, and all manipulation of the flow is all occurring downstream of where the airflow meter 62 on the engine is typically located, therefore, all of the amount of airflow measured by the airflow meter gets to the engine cylinders. The system matching for the ejector cooling system in the present invention is ideal in that the energy of the compressor discharge gas is dependent on the rotational speed of the turbocharger. Higher rotational speed implies higher bearing and component temperatures; however, the higher energy of the discharge bleed gas for the primary ejector flow allows pumping of a larger volume of cooling gas through the ejector secondary flow.

Figure 3:
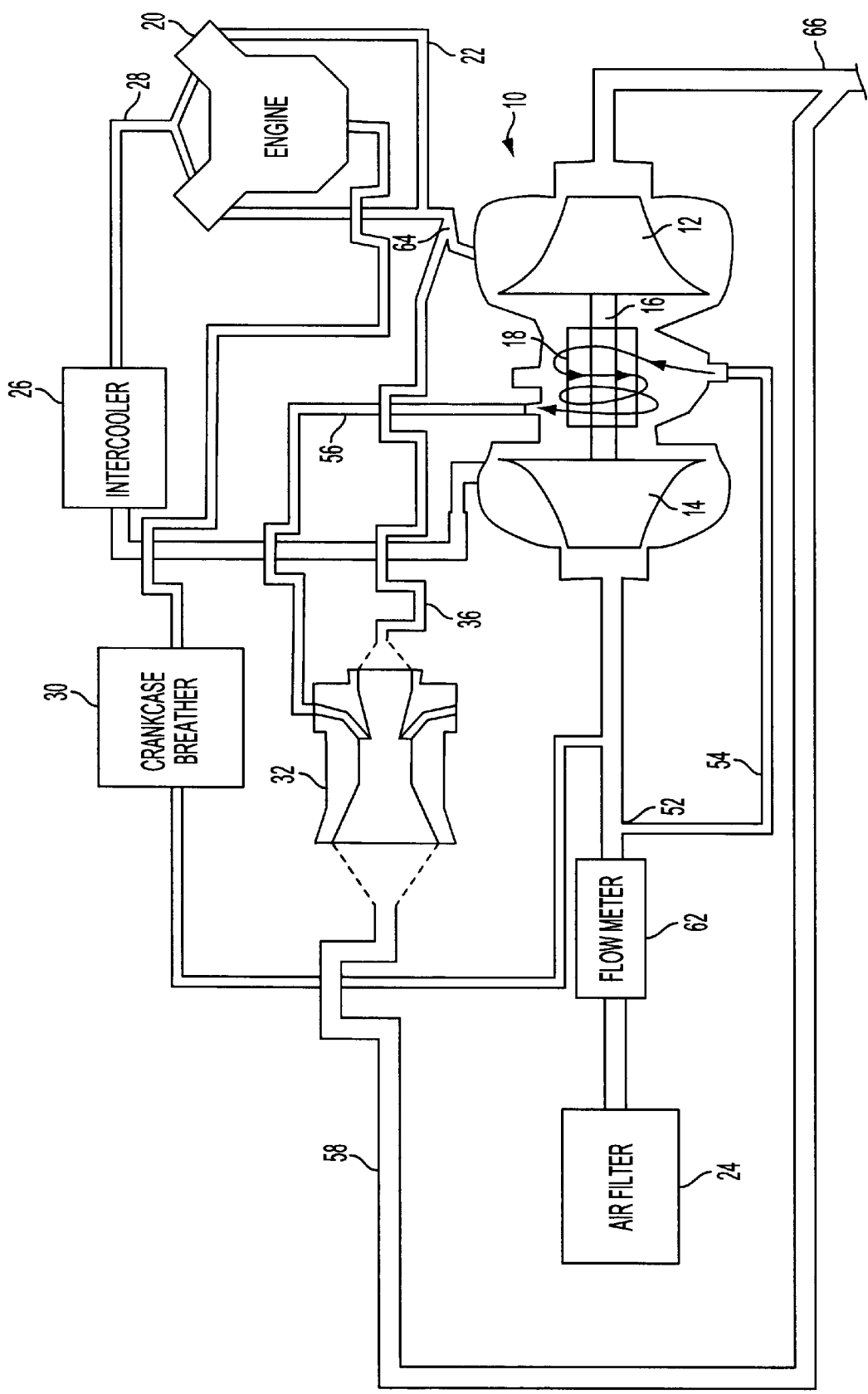
FIG. 3 is a schematic block diagram of a turbocharger system employing an ejector cooling entrainment system using turbine inlet flow as the source of high energy gas for the primary ejector flow.

An alternative embodiment of the present invention using bleed flow from the engine exhaust gas inlet to the turbine as the high energy primary flow for the ejector is shown in FIG. 3. The primary components of the system are comparable to those described with respect to FIG. 1; however, the high energy gas stream is provided through a first bleed port 64 in the exhaust manifold upstream of the turbine inlet. The mixed flow from the ejector is dumped into the low pressure exhaust gas stream through a "Y" 66 or, alternatively, an annular mixer downstream of the turbine outlet for treatment with the main exhaust gas stream from the turbocharger.

Figure 4:
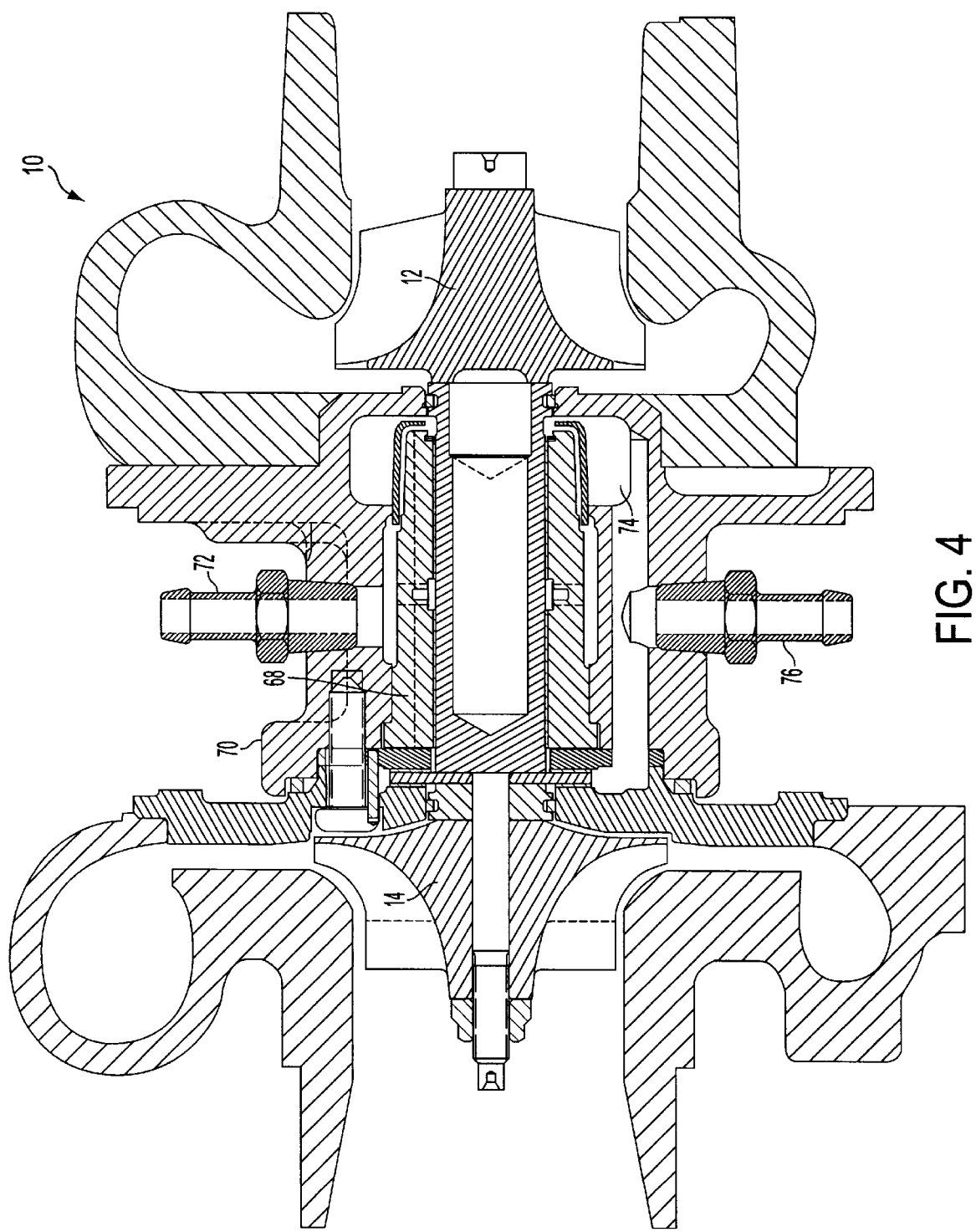
FIG. 4 shows an exemplary embodiment of a cooling flow path in a center housing of a turbocharger employing an air bearing.
Figure 5:
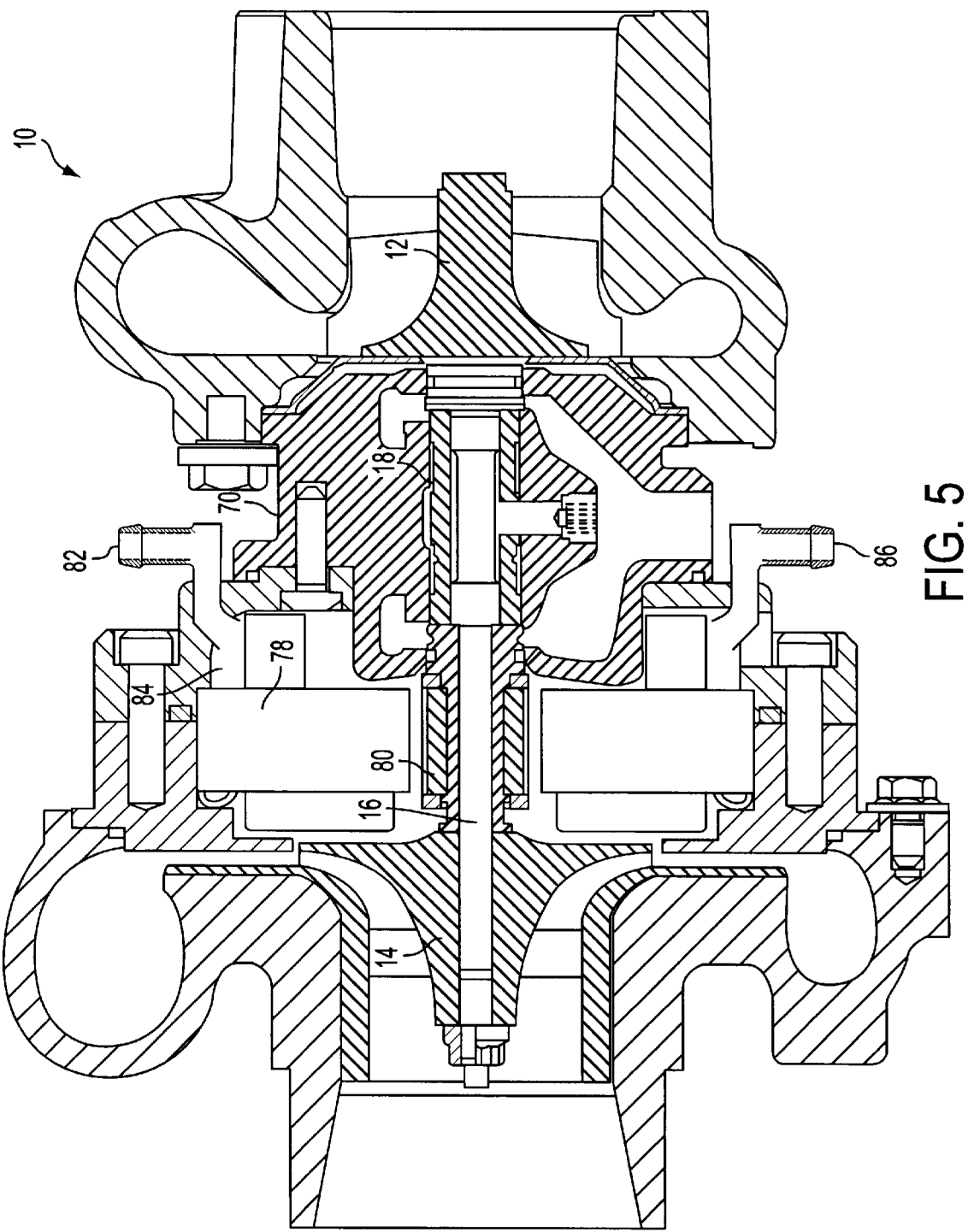
FIG. 5 shows an exemplary embodiment of a cooling flow path in a center housing of a turbocharger employing an electric motor stator and rotor for electrically assisting operation of the turbocharger.

Cooling flow provided by the present invention is employed in several exemplary embodiments shown in FIGS. 4 and 5. FIG. 4 demonstrates a system employing the combined components of the invention for cooling an air bearing 68 in the turbocharger center housing 70. The air bearing supports the shaft 16 which interconnects the turbine and compressor. The cooling air flow is drawn from the first coolant conduit 54 through the center housing coolant inlet 72 for circulation in the plenum 74 surrounding the air bearing. Details of the plenum and flow configuration of the coolant are dependent on the air bearing configuration. The cooling air is exhausted from the center housing through coolant outlet 76 to which the second coolant conduit 56 is attached for carrying the coolant flow to the ejector.

FIG. 5 shows a second application of the invention for cooling the stator 78 and rotor 80 of an electric motor in an electrically assisted turbocharger. The rotor is integral to or mounted on the shaft of the turbocharger. The stator is mounted in the center housing concentric to the shaft. In the embodiment shown in the drawing, the cooling air flow is drawn from the first coolant conduit 54 through the center housing coolant inlet 82 for circulation in the plenum 84 surrounding the stator and rotor. The cooling air is exhausted from the center housing through coolant outlet 86 to which the second coolant conduit 56 is attached for carrying the coolant flow to the ejector.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A turbocharger component cooling system comprising:
   an ejector having a primary inlet, a secondary inlet and an outlet;
   an energizing gas conduit connecting a first bleed port from a high energy gas source and the primary inlet;
   a cooling gas conduit having a first element connecting a coolant inlet to a component cooling plenum and a second element connecting the cooling plenum to the secondary inlet; and
   an outlet gas conduit connecting the ejector outlet to a low pressure dump.

2. A turbocharger component cooling system as defined in claim 1 wherein the high energy gas source comprises a turbocharger compressor.

3. A turbocharger component cooling system as defined in claim 2 wherein the low pressure dump comprises an entrainment port in an inlet of the turbocharger compressor.

4. A turbocharger component cooling system as defined in claim 1 wherein the high energy gas source comprises a turbocharger turbine exhaust gas inlet.

5. A turbocharger component cooling system as defined in claim 4 wherein the low pressure dump comprises an entrainment port in an outlet of the turbocharger turbine.

6. A turbocharger component cooling system as defined in claim 1 wherein the ejector output incorporates a diffuser.

7. A turbocharger component cooling system as defined in claim 1 wherein the coolant inlet comprises a second bleed port in an inlet of the turbocharger compressor.

8. A turbocharger component cooling system comprising:
   an ejector having a primary inlet, a secondary inlet and an outlet;
   means for providing a high energy gas stream to the primary inlet;
   means for supplying a cooling gas stream through a component cooling plenum in the turbocharger to the secondary inlet; and
   means for dumping the ejector outlet.

9. A turbocharger component cooling system as defined in claim 8 wherein the means or providing a high energy gas stream comprises an energizing gas conduit connecting a first bleed port from a turbocharger compressor to the primary inlet.

10. A turbocharger component cooling system as defined in claim 8 wherein the means for supplying a cooling gas stream comprises a cooling gas conduit having a first element connecting a coolant inlet to a component cooling plenum and a second element connecting the cooling plenum to the secondary inlet.

11. A turbocharger component cooling system as defined in claim 9 wherein the means for dumping the ejector outlet comprises an outlet gas conduit connecting the ejector outlet to an entrainment port in an inlet of the turbocharger compressor.

12. A turbocharger component cooling system as defined in claim 8 wherein the means for providing a high energy gas stream comprises an energizing gas conduit connecting a first bleed port from a turbocharger turbine exhaust gas inlet.

13. A turbocharger component cooling system as defined in claim 12 wherein the means for dumping the ejector outlet comprises an outlet gas conduit connecting the ejector outlet to an entrainment port in an entrainment port in an outlet of the turbocharger turbine.

14. A turbocharger component cooling system as defined in claim 10 wherein the coolant inlet comprises a second bleed port in an inlet of the turbocharger compressor.

15. A cooled air bearing turbocharger system comprising:
   a turbine carried within a turbine housing having an exhaust gas inlet and an outlet;
   a compressor carried within a compressor housing having an air inlet and a charge air outlet, the compressor interconnected to the turbine by a shaft;
   a center housing interconnecting the turbine housing and compressor housing and carrying an air bearing system in a cooling plenum, the air bearing supporting the shaft;
   an ejector having a primary inlet, a secondary inlet and outlet;
   an energizing gas conduit connecting a first bleed port from a high energy gas source and the primary inlet;
   a cooling gas conduit having a first element connecting a coolant inlet to the cooling plenum and a second element connecting the cooling plenum to the secondary inlet; and
   an outlet gas conduit connecting the ejector outlet to a low pressure dump.

16. A cooled air bearing turbocharger system as defined in claim 15 wherein the high energy gas source comprises the charge air outlet.

17. A cooled air bearing turbocharger system as defined in claim 16 wherein the low pressure dump comprises an entrainment port in the compressor air inlet.

18. A cooled air bearing turbocharger system as defined in claim 15 wherein the high energy gas source comprises the turbine exhaust gas inlet.

19. A cooled air bearing turbocharger system as defined in claim 18 wherein the low pressure dump comprises an entrainment port in the turbine outlet.

20. A cooled air bearing turbocharger system as defined in claim 15 wherein the coolant inlet comprises a second bleed port in the compressor air inlet.

21. A cooled electrically assisted turbocharger system comprising:
   a turbine carried within a turbine housing having an exhaust gas inlet and an outlet;
   a compressor carried within a compressor housing having an air inlet and a charge air outlet, the compressor interconnected to the turbine by a shaft, the shaft carrying a rotor for an electric motor;
   a center housing interconnecting the turbine housing and compressor housing and carrying a stator in operating relation with the rotor, the stator and rotor surrounded by a cooling plenum, the center housing further having a bearing supporting the shaft;
   an ejector having a primary inlet, a secondary inlet and outlet;
   an energizing gas conduit connecting a first bleed port from a high energy gas source and the primary inlet;
   a cooling gas conduit having a first element connecting a coolant inlet to the cooling plenum and a second element connecting the cooling plenum to the secondary inlet; and
   an outlet gas conduit connecting the ejector outlet to a low pressure dump.

22. A cooled electrically assisted turbocharger system as defined in claim 21 wherein the high energy gas source comprises the charge air outlet.

23. A cooled electrically assisted turbocharger system as defined in claim 22 wherein the low pressure dump comprises an entrainment port in the compressor air inlet.

24. A cooled electrically assisted turbocharger system as defined in claim 21 wherein the high energy gas source comprises the turbine exhaust gas inlet.

25. A cooled electrically assisted turbocharger system as defined in claim 24 wherein the low pressure dump comprises an entrainment port in the turbine outlet.

26. A cooled electrically assisted turbocharger system as defined in claim 21 wherein the coolant inlet comprises a second bleed port in the compressor air inlet.

* * * * *